Feb. 27, 1934.   C. W. BALKE   1,948,489
TOOL AND METHOD OF MAKING SAME
Filed Oct. 11, 1930
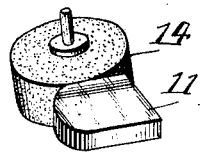
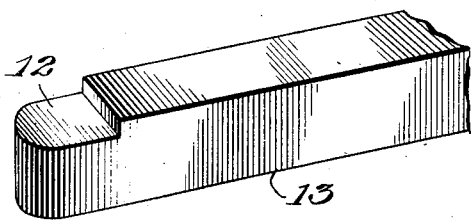
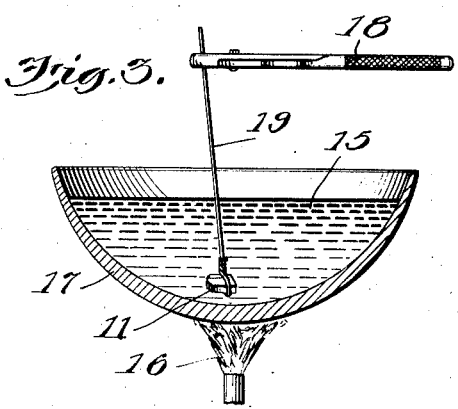
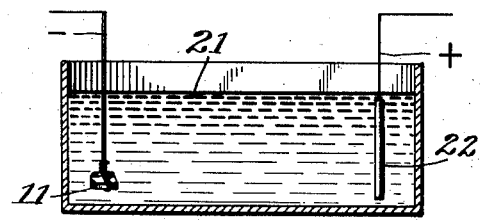
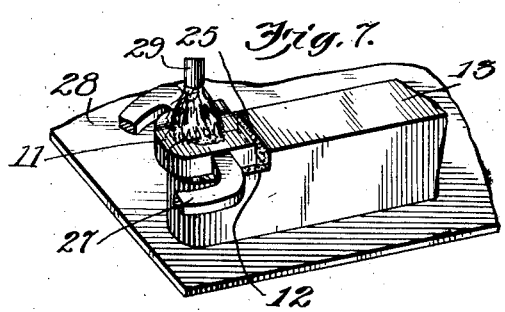
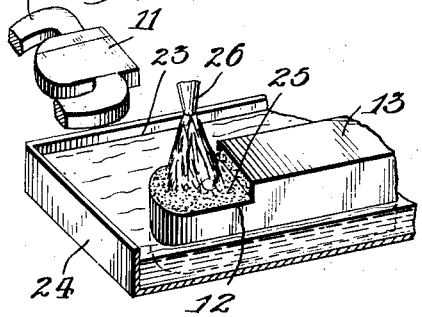
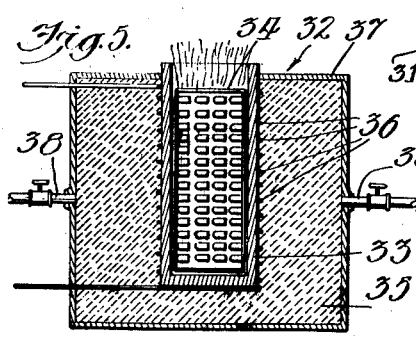
Inventor:
Clarence W. Balke
By Williams, Bradbury,
McCaleb & Hinkle
Attys.

Patented Feb. 27, 1934

1,948,489

UNITED STATES PATENT OFFICE 1,948,489

TOOL AND METHOD OF MAKING SAME

Clarence W. Balke, Highland Park, Ill., assignor, by mesne assignments, to Ramet Corporation of America, North Chicago, Ill., a corporation of Illinois Application October 11, 1930. Serial No. 488,175

11 Claims. (Cl. 76—101)

This invention relates in general to soldering, and has more particular reference to tools and to a novel method of attaching a hard or refractory tool portion to a tool portion of ordinary metals.

A primary object of the present invention is the production and provision of a novel tool having a working or cutting portion of refractory metal or an alloy thereof which will not crack when attached to a body or shank of an ordinary or base metal.

An important object of this invention is to provide a novel method of securing a refractory working or cutting portion of a tool to a tool body or shank without cracking the working portion.

Another important object of the invention is to so treat a tool portion comprising a refractory metal carbide and a metal of the iron group that the tool portion may be securely soldered to a tool body.

A further important object of the invention is the provision of a tantalum, carbon or boron, and nickel tool portion or bit which may be electroplated and subsequently so securely attached to a tool body or shank of ordinary metal that the bit does not back away or recede from the work while the tool is in use.

Other objects and advantages of the invention will appear from the following description.

Referring to the drawing:

Fig. 1 is a partial perspective view of a refractory bit being ground to fit a tool shank;

Fig. 2 is a partial view in perspective of a tool shank adapted to carry the bit shown in Fig. 1;

Fig. 3 illustrates a step in the treatment of a refractory metal or alloy thereof to prepare it for attachment to an ordinary metal;

Fig. 4 illustrates another step in the novel method of the invention;

Fig. 5 is a horizontal section through a furnace illustrative of a heat treatment of the coated bits;

Fig. 6 is a fragmentary view in perspective of a shank and diagrammatically illustrates a step in soldering a bit to the shank;

Fig. 7 is a fragmentary view in perspective of a bit and shank illustrative of a modification of the step shown in Fig. 5; and Fig. 8 is a perspective view of a completed tool.

Briefly the present invention involves fitting a tool portion made of a refractory metal such as tantalum, columbium, and tungsten, a metalloid such as carbon and boron, and a metal of the iron group such as iron, nickel, and cobalt to a tool portion of an ordinary or relatively inexpensive metal. The refractory portion is then plated or coated with a metal which can be "wet" by a hard solder, and this plate or coating is baked on the refractory portion, the coated tool portion being subsequently soldered to the portion of ordinary metal.

The usual or common soldering materials or compounds do not wet the refractory metals or alloys mentioned above for the reason, among others, that there is a hard oxide surface formed on these metals and alloys. In order, therefore, to solder a tool portion or bit of such refractory metals or alloys thereof to a tool body or shank, it is necessary to plate or coat the tool bit with a material which can be soldered by means of a usual hard soldering material to a tool shank. It has been found, however, that such alloys resist electroplating probably for the same reasons that they resist soldering. The present invention, therefore, has for an object so treating tool bits or other devices made from refractory metals or alloys that they may be electroplated and securely soldered to ordinary metals.

To this end a bit or cutting portion 11 comprising a refractory metal such as tantalum, a metalloid such as carbon or boron, and a metal of the iron group such as nickel, is fitted as shown in Figs. 1 and 2 to a seat 12 provided on a tool shank or body 13 by grinding the bit by means of a grinder 14. This grinding of the bit 11 is carefully done in order not to heat the refractory bit. It is important to avoid sudden changes in the temperature of the bit because sudden temperature changes may produce expansion thereof with the result of cracking or checking of the bit or cutting portion 11.

While the shank 13 may be of any suitable ordinary or inexpensive metal having a relatively low coefficient of expansion, it is here preferred to employ a tough steel such as that known in the art as chisel steel. In preparing the shank 13 for receiving the bit 11 it is important to remove machining strains or stresses therein before attempting to mount the bit 11 and after the provision of the seat 12 in the shank 13. These strains or stresses may be removed by heating the shank in a closed furnace to approximately 1800 degrees Fahrenheit and allowing the shank to cool slowly over a period of about eight hours.

After the bit 11 has been fitted to the seat 12, the bit is treated so that solder will effect a joint between the bit and the seat 12. I have found that refractory metal or alloys thereof such as those already mentioned may be electroplated if they are first subjected to a reagent which will pit or roughen their surfaces. Accordingly a good grade of caustic potash 15 is melted and cautiously heated by any suitable heating means, such as that diagrammatically illustrated at 16 in Fig. 3, until the water and vapor have been expelled from the caustic potash and the temperature of the molten bath is at a low red heat, the caustic potash being so heated in a nickel vessel or crucible 17. The bit 11 is next slowly heated or warmed and dipped or immersed in this bath of molten caustic potash by means of crucible tongs 18 and a small iron wire 19 attached to the bit 11. The bit, after the preheating described above, is lowered into the crucible 17 and moved about in the potash bath. This fused solution of potash vigorously attacks the bit, leaving it with a rough or pitted surface which I have found can be electroplated with metals that may be wet by ordinary hard solders.

The preheating or warming of the bit 11 before it is immersed in the molten potash bath avoids the sudden raising of the temperature of the bit to that of the bath and is a precaution against cracking or checking of the bit such as may be caused by a sudden change in temperature thereof. The pitted or rough bit 11 is removed from the caustic potash and allowed to cool after which the adhering potash is removed from the bit by washing it in water.

This treatment of the bit 11 probably exposes the base metal used in the alloy. I do not wish, however, to limit the invention by the recitation of the theory underlying this action of the potash on the refractory bit. Whatever this action may be, the bit can be electroplated after it has been subjected to the pitting or roughening reagent.

The bit is next immersed in a solution 21 of a salt of a metal such as copper or nickel with which it is to be plated. Preferably I use a nickel salt and nickel-plate the bit as schematically illustrated in Fig. 4 because, while nickel or copper make a satisfactory plate for the bit, the nickel does not dissolve in a silver solder, which has a low melting point, and leave the refractory bit 11 bare. Any commercial nickel-plating bath utilizing a pure nickel electrode such as that shown at 22 in Fig. 4 may be used to electroplate the bit 11, it being important to maintain the bath 21 in acid condition in order to assure adhesion between the nickel and the bit immersed in the electroplating bath.

The plated bit is next heated in a vacuum or in a hydrogen atmosphere to a temperature of at least 1000 degrees C. to reduce whatever oxides that may still remain on the bit and to bake the nickel plate on the bit 11. This heating of the plated bit may be done in any suitable manner, as for example in a furnace 32 as shown in Fig. 5. While the furnace 32 per se forms no part of the present invention, and its description is not necessary to a complete understanding thereof, it may be well to mention that the furnace may include, briefly, a porous alundum cylinder 33 for carrying a vessel or pan 34 adapted to hold a plurality of plated bits 11. This cylinder 33 may be imbedded in a refractory powder 35 such as magnesia powder and heated by a molybdenum coil 36 supplied with energy from a suitable source, not shown. The powder 35 and the cylinder 33 imbedded therein are carried in a suitable container 37 having hydrogen inlets 38 for supplying hydrogen to the alundum cylinder. A plurality of the bits may be heated in the furnace and thereby made ready for attachment to the shank 13.

In attaching the plated bit to the seat 12, it is important to avoid rapid heating of the bit and to so control the heating and cooling of the shank and bit as to prevent the cracking or checking thereof due to the stresses caused by the different thermal coefficients of expansion. While a material which has a relatively low thermal coefficient of expansion is selected in the making of the shank, the chisel steel employed has a coefficient of expansion greater than that of the refractory bit 11. I have found that if an attempt be made to solder the bit 11 to the seat 12 by the methods most readily and naturally suggested, such as by heating the shank 13 to the melting point of the solder on the seat with the bit 11 in place or subsequently placed on the seat and permitting the tool to cool, the bit 11 frequently cracks in cooling.

In order to prevent such cracking of the bit 11 the shank 13 as shown in Fig. 6 is partially immersed in a cooling medium or liquid 23 contained in a vessel or pan 24 to cool the shank and to limit its maximum temperature during the subsequent soldering operation.

Any suitable soldering flux such as borax is suitably applied to the bit 11 and the seat 12 as by painting the bit and seat with the soldering flux and a hard solder 25 is applied to the seat 12. While any usual hard solder which will wet the two surfaces to be soldered may be employed, it is here preferred to use a silver solder comprising substantially 60% silver, 25% copper and 15% zinc, because such a solder has a relatively low melting point and has been found to securely attach the bit to the shank. Because of the low thermal conductivity of the bit material, a higher melting point solder is unnecessary, for the temperature at the joint between the bit and the shank, developed in or by the use of the tool, will seldom reach a point which will soften or melt even a low melting point solder.

This solder 25 is then heated by any suitable means such as an oxyhydrogen or oxyacetylene torch diagrammatically illustrated at 26 in Fig. 5. This torch 26 as illustrated preferably has a tip which provides a slender flame that may be directed on the seat 12 without appreciably heating other portions of the shank.

While the seat 12 is being so prepared, the plated bit 11 is slowly heated to about 1500 degrees F. by any suitable means such as a gas or electric furnace and this temperature of the bit is maintained until the solder 25 on the seat 12 reaches the molten state from the heat supplied by the torch 26. The slow heating of the bit 11 may be accomplished by first placing a bit on the ledge in front of the furnace and moving it forward into the furnace gradually. The heated bit is next removed from the furnace with a pair of hot tongs 27 and pressed on the molten solder 25 on the seat 12.

As shown in Fig. 7 a plate 28 of any good thermal conducting material such as copper may replace the vessel 24 and the cooling medium or water 23 therein without departing from the spirit or scope of the invention. It is also permissible, as illustrated in the drawing, to heat the bit 11 after it has been placed on the molten solder on the seat 12 by any suitable heating means such as a torch 29. It will, of course, be understood that where the bit is so heated it is previously warmed in order to avoid the cracking of the bit. Either the plate 28 or the liquid 23 will prevent the temperature of the shank 13 from being raised to that to which it might otherwise be raised and will provide for more rapid cooling of the shank, or the portion having the higher coefficient of expansion, than of the bit. In either case the bit 11 is held by the tongs 27 on the seat 12 until the solder 25 sets, after which the tool is removed from the water 23 or from the plate 28 and allowed to cool in the air or it may be placed in magnesite or silocel or any other suitable insulating medium and allowed to cool for several hours.

I have found that the electro-plated bit 11 after the plating has been baked on in the furnace 32 may also be secured to the shank 13 by means of a low melting point metal or alloy such as zinc, zinc with substantially one-fourth of one per cent aluminum to increase the fluidity of the zinc, or a zinc with one-fourth of one per cent aluminum and up to five per cent copper. While any low melting point metal or alloy, which will alloy with or wet the nickel plate, may be used for attaching the plated bit to the shank, I prefer to employ zinc or alloys thereof which melt at substantially 419 degrees C.

In so attaching the plated bit to the shank, any suitable soft soldering flux, such as ammonium chloride or ammonium chloride and zinc chloride, is applied to the seat 12. A bath of the zinc or zinc alloy mentioned above is prepared by melting the zinc or alloy thereof in a crucible. The plated bit 11 and the shank 13 are then dipped or partially immersed in this molten bath of zinc, the shank being dipped in the molten metal so that the seat 12 is immersed therein. The zinc or alloy tenaciously adheres to the plated bit 11.

When the bit 11 and the seat 12 of the shank 13 have been coated with the molten metal, they are removed from the bath by tongs or other suitable means and the bit is placed upon the seat 12 and held there until the zinc sets. The tool is then permitted to cool in air, and if desired the zinc on the sides of the shank and bit may be removed to complete the tool.

The completed tool is illustrated in Fig. 8, from which it will be noticed that an extremely thin layer 31 of silver solder or zinc securely holds the bit 11 on the seat 12 and effects an exceedingly tight joint between the bit and the shank. The bit of such a tool does not crack upon cooling, nor does it back away or recede from the work. The novel method of the invention provides a tool which is therefore particularly well adapted for accurate work and heavy duty.

While I have illustrated a preferred embodiment of my invention and have associated the same with a particular type of apparatus, it is applicable for other uses. It is also apparent that changes and modifications may also suggest themselves, and I therefore aim to cover all such changes and modifications as will suggest themselves to a person skilled in the art.

I claim:

1. A method of attaching a refractory metal tool portion to a base metal portion which comprises nickelplating the refractory metal portion, baking the plating on said refractory metal portion, and attaching it to the portion of base metal by means of silver solder.

2. A method of attaching a tantalum carbide tool portion to a steel tool portion which comprises electroplating the tantalum carbide portion with nickel, baking the nickel on the carbide portion, and soldering it to the steel portion.

3. A method of attaching a tantalum carbide tool portion to a tool portion of base metal, which comprises etching the tantalum carbide portion in caustic potash, electroplating it, and soldering the plated portion to the portion of base metal.

4. A method of affixing a plated tantalum alloy cutting portion to a steel tool body, which comprises applying heat directly to solder on the steel body, heating the cutting portion in contact with said body, and cooling the tool.

5. A method of affixing a refractory metal alloy cutting portion to a tool body, which comprises electroplating the cutting portion, baking the plated cutting portion in an atmosphere of hydrogen, applying solder to the tool body, applying heat directly to the solder on the tool body, heating the cutting portion, and positioning said heated portion on said body.

6. A method of attaching together metallic bodies having different thermal coefficients of expansion, which comprises placing the body having the greater coefficient of expansion in a cooling medium, applying heat directly to solder on the body in the cooling medium, heating the other body, and placing it on the first said body.

7. A method of attaching a refractory metal alloy to a base metal, which comprises bringing the base metal into contact with a thermally conducting sheet applying solder to the base metal while said base metal is in contact with said sheet, preheating said refractory metal alloy while applying heat directly to said solder on said base metal, placing said refractory metal alloy on said base metal, and allowing the heated metals to cool.

8. A tool comprising a steel body, a working portion of tantalum carbide having an electroplating thereon, and silver solder holding said plated working portion to said body.

9. A method of attaching a refractory metal alloy to a base metal which comprises heating and cooling the base metal, and simultaneously partially immersing the base metal in a liquid and slowly heating a plated refractory metal alloy, and soldering the heated refractory metal alloy to the base metal in the liquid.

10. A tool comprising a steel body, a working portion of tantalum carbide having an electroplating thereon, and zinc holding said plated working portion to said body.

11. A tool comprising a tool body, a refractory metal working portion having a rough surface, a nickel plating adhering to said rough surface, and solder between said nickel plating and said tool body securing said refractory working portion to said tool body.

CLARENCE W. BALKE.